2,850,389

PROCESS FOR INHIBITING STALING OF YEAST RAISED BAKERY PRODUCTS

Chester W. Ofelt, Charles L. Mehltretter, and Felix H. Otey, Peoria, Ill., assignors to the United States of America as represented by the Secretary of Agriculture No Drawing. Application January 30, 1957
Serial No. 637,333

1 Claim. (Cl. 99—91)

(Granted under Title 35, U. S. Code (1952), sec. 266)

A non-exclusive, irrevocable, royalty-free license in the invention herein described, throughout the world, for all purposes of the United States Government with the power to grant sublicenses for such purposes is hereby granted to the Government of the United States of America.

This invention relates in general to the production of bakery products such as bread, sweet rolls, cakes, and the like. More particularly, the invention concerns procedures for preparing such bakery products which are characterized by an ability to retain much of their original softness of crumb for a considerable period of time. Specifically, the invention relates to processes wherein certain agents, as described below, are incorporated into the dough prior to baking whereby staling of the baked product will be effectively retarded.

The problem of bread staling has been investigated in many quarters in the past 10 or 15 years. Normally bread and similar bakery products do not retain their original texture for any considerable period of time after they are prepared. In particular the crumb becomes increasingly firm. This firming is not a single matter of loss of moisture but involves chemical and/or physical changes which cannot be satisfactorily explained. In continuing research on this problem various so-called bread-softeners or anti-staling agents, as they may be termed, were developed to meet the consumer's demand for bread which retained a soft crumb for extended periods. At the present time most bread and similar yeast-raised products contain a small proportion of a monoglyceride to attain this anti-staling effect. Various other agents have also been proposed for use in this regard.

It has now been found that certain organic compounds not hitherto proposed for such use exhibit the useful property of inhibiting the staling of bakery products to an exceptional extent. These compounds can be generically designated as mono-esters of a long-chain fatty acid containing from 18 to 22 carbon atoms and D-glucose in which only the hydroxyl group on carbon atom 3 of D-glucose is esterified with the fatty acid.

The esters of the invention may be derived from any of the appropriate long-chain fatty acids, examples of these being stearic, behenic, arachidic, oleis, elaidic, linoleic, and the like, and their mixtures such as hydrogenated vegetable and fish oil fatty acids. It is preferred, however, to use an ester of a saturated acid, particularly stearic acid.

The esters can be prepared by conventional esterification procedures, but it has been found advantageous to prepare them by heating the long-chain fatty acid halide, for example, stearoyl chloride, with 1,2:5,6-diisopropylidene-D-glucose in the presence of dimethylformamide or pyridine, or both. Subsequent hydrolysis of the 3-stearoyl-1,2:5,6-diisopropylidene-D-glucose with mineral acid eliminates acetone and produces 3-stearoyl-D-glucose. The 3-stearoyl-1,2:5,6-diisopropylidene-D-glucose may also be prepared from methyl stearate and glycerol long-chain fatty acid esters by transesterification with 1,2:5,6-diisopropylidene-D-glucose using alkaline catalysts. It is also possible to prepare it by reaction of stearic acid with 1,2:5,6-diisopropylidene-D-glucose with removal of water of reaction by entrainment or otherwise. The use of other acetals of D-glucose in which only the hydroxyl group of carbon atom 3 of the molecule is free to react with the acid halides of long-chain fatty acids is also indicated.

Fatty acids containing from 18 to 22 carbon atoms or fatty acid mixtures predominantly containing such fatty acids are suitable for the purpose of the invention in production of the 3-substituted glucose esters. Fatty acids of lower molecular weight such as palmitic acid as the 3-substituted glucose esters are not suitable as the esters do not possess the unique properties of 3-stearoyl-D-glucose and the higher fatty acid esters for improving the softness and keeping properties of bread and other bakery goods. In addition 3-stearoyl-D-glucose appears to have an effect similar to that of potassium bromate in conditioning doughs, and the level of other oxidizing agents thus may be reduced when 3-stearoyl-D-glucose is used. Also when 3-stearoyl-D-glucose is incorporated in the mix, doughs are obtained which are "drier" than untreated doughs and hence machineability is improved. Furthermore, additional water may be introduced to the 3-stearoyl-D-glucose treated mix to yield doughs equivalent in mobility to comparable doughs not treated with this antifirming agent.

In applying the process of the invention, the glucose esters are incorporated into the dough, prior or subsequent to its raising by fermentation, in a percentage from 0.1 to 1.0 and preferably from 0.1 to 0.4, based on the weight of flour. Usually it is most convenient to incorporate the glucose ester into the shortening before this is incorporated with the flour and other ingredients. In any event, the dough apart from containing the added glucose ester is prepared and processed in the customary manner as is well understood in the baking trade. The glucose ester may be added to yeast-raised doughs of any type whether for preparation of white bread, coffee cake, sweet rolls, buns, doughnuts, and specially breads such as raisin, whole wheat, low-protein, rye, corn, potato, sour-dough, etc.

By addition of the said glucose esters to the dough, the resulting bakery products will retain their freshness for 2 to 4 days longer than bakery products prepared without addition of any anti-staling agent. In this respect it may be noted that the glucose esters of the invention exhibit an anti-staling appreciably greater than that of the best monoglyceride bread-softeners presently available for this purpose. The glucose esters of the invention are effectively used in baked products which are of the high-fat or low-fat categories. For instance the glucose esters may be successfully employed in bread formulas containing anywhere from 1 to 10 percent or more of shortening.

A specific procedure for preparation of 3-stearoyl-D-glucose is as follows:

Fifty-two grams (0.2 mole) of 1,2:5,6-diisopropylidene-D-glucose were dissolved in 150 ml. of dry pyridine. Gradually added to this solution was 100 ml. of dry alcohol-free chloroform containing 66.6 grams (0.22 mole) of stearoyl chloride. The reaction mixture protected from air moisture was stirred at room temperature for 24 hours. It was then added to diethyl ether and washed free of pyridine with aqueous 0.1 Normal sulfuric acid. The pyridine-free ether solution was neutralized with aqueous sodium bicarbonate solution. The 3-stearoyl-1,2:5,6-diisopropylidene-D-glucose in ether solution was deacetonated by stirring with an equal volume of concentrated hydrochloric acid at room temperature for one hour. Then 1400 ml. of water were added and the whole stirred another hour. The precipitated crude 3-stearoyl-D-glucose was removed by filtration, washed with ether and then washed acid free with water and dried in vacuo at 60° C., M. P. 125–130° C. Analysis for 3-stearoyl-D-glucose product: Calcd. for $C_{24}H_{46}O_7$: C, 64.5%; H, 10.4%. Found: C, 64.1%; H, 10.3%.

The invention is further demonstrated by the following example:

EXAMPLE I

In order to demonstrate the effectiveness of the glucose esters of the invention a series of breads were prepared. One lot contained no anti-staling agent (control), another lot contained 0.4 percent (based on weight of flour) of glycerol monostearate (a conventional bread softener), a third lot contained 0.4 percent (based on weight of flour) of a glucose ester prepared in accordance with the above described procedure.

The following formula was used:

| | | |
|---|---|---|
| Flour | grams | 660 |
| Water | ml | 430 |
| Salt | grams | 13.2 |
| Sugar | do | 39.6 |
| Active dry yeast | do | 2.97 |
| Potassium bromate | do | 0.0099 |
| Calcium chloride | do | 0.363 |
| Ammonium sulfate | do | 0.429 |

Additional ingredients for different lots as follows:

Lot 1: Lard _____ 26.4 grams (4% based on flour).
Lot 2:
   Lard _____ 23.76 grams (3.6% based on flour).
   Glycerol monostearate ____ 2.64 grams (0.4% based on flour).
Lot 3:
   Lard _____ 23.76 grams (3.6% based on flour).
   Glucose ester of Example II __ 2.64 grams (0.4% based on flour).

A. Preparation of ingredients

A solution was prepared containing 475.2 grams of sugar, 158.5 grams of salt in 2112 ml. water whereby 228.8-gram aliquots of solution provided the proper amount of salt and sugar for each mix of 660 grams of flour.

Dried yeast (81 grams) was dispersed in water (519 ml.) so that a 50-gram aliquot provided the proper amount of yeast for a 660-gram flour mix. The yeast was dispersed in water at 115° F. and maintained at this temperature for at least 5 minutes before use.

The potassium bromate was dissolved in water (6.6 grams per liter) so that a 1.5 ml. aliquot yielded a concentration of 0.0015 percent in a mix with 660 grams of flour.

The calcium chloride was dissolved in water (72.6 grams/liter) so that a 5-ml. aliquot yielded a concentration of 0.055 percent in a 660-gram flour mix.

The ammonium sulfate was dissolved in water (85.8 grams/liter) so that a 5-ml. aliquot yielded a concentration of 0.065 percent in a 660-gram flour mix.

B. Mixing procedure

The flour (a 2:1 blend of hard red winter and hard red spring), shortening, anti-staling ingredient (if any), yeast suspension, sugar-salt solution, $CaCl_2$ solution, $(NH_4)_2SO_4$ solution, $KBrO_2$ solution, and the remainder of water required were placed in a Hobart mixer with McDuffee bowl and after incorporation for 30 seconds at low speed were mixed to optimum development (280 seconds) at second speed according to usual straight dough procedure.

C. Fermentation and baking

The dough was fermented at 86° F. and 85 percent R. H. for 105 minutes, "punched" by hand, fermented for another 30 minutes then scaled to 535 gram pieces, degassed by passing through a National 1-lb. dough sheeter, fermented for 15 minutes more and then molded by passing through a pair of sheeting rolls 3 times at 5/8″, 3/8″ and 1/8″ then curling by hand and placing in a standard 1-lb. loaf tin. The doughs were proofed to 5/8″ over the top of the pan at 95–98° F. and 85 percent R. H. They were then baked in a rotating hearth oven at 425° F. with only bottom heat and with low pressure steam admitted to the oven. They were weighed and measured for loaf volume immediately upon removal from the oven. The loaves were cooled for one hour at room atmosphere. They were then wrapped in double waxed glassine paper with heat sealing ends and bottom. They were stored at approximately 78° F. 45 percent R. H. for 45 hours prior to softness evaluation.

D. Softness evaluation

After 45 hours' storage each loaf was tested for crumb firmness with a modified Bloom gelometer. The weight necessary to cause a depression of 4 mm. using a 1-inch diameter disc at the slice center was determined on 12 center slices from each loaf. Loaves were in duplicate from each mix and mixes were in quadruplicate to yield a total of eight loaves for each treatment. Results were averaged and, after statistical analysis, corrected to a constant loaf volume of 2770 ml.

The results are tabulated below:

| Lot | Shortening | Antistaling agent | Firmness of crumb, grams | Deviation from control, grams |
|---|---|---|---|---|
| 1 | Lard, 4% | None | 103.8 | |
| 2 | Lard, 3.6% | Glycerol monostearate, 0.4% | 93.9 | −9.9 |
| 3 | Lard, 3.6% | 3-stearoyl-D-glucose 0.4% | 87.2 | −16.6 |

Having thus described our invention, we claim:

A process for inhibiting staling of yeast-raised bakery products which comprises incorporating into the dough, prior to baking, about 0.1 to 1 percent, based on the weight of flour, of 3-stearoyl-D-glucose.

References Cited in the file of this patent

FOREIGN PATENTS 648,782    Great Britain _____ Jan. 10, 1951